US009710567B1

United States Patent
Lobdell et al.

(10) Patent No.: US 9,710,567 B1
(45) Date of Patent: Jul. 18, 2017

(54) AUTOMATED CONTENT PUBLICATION ON A SOCIAL MEDIA MANAGEMENT PLATFORM

(71) Applicant: Hearsay Social, Inc., San Francisco, CA (US)

(72) Inventors: Scott Lobdell, San Francisco, CA (US); Gregory Kroleski, San Francisco, CA (US); Benjamin Henry, San Francisco, CA (US); Jeremiah Lee, San Francisco, CA (US); Akshay Shah, San Francisco, CA (US); Emi Nomura, San Francisco, CA (US); Austin Bisharat, San Francisco, CA (US)

(73) Assignee: Hearsay Social, Inc., San Francisco, CA (US)

( * ) Notice: Subject to any disclaimer, the term of this patent is extended or adjusted under 35 U.S.C. 154(b) by 176 days.

(21) Appl. No.: 14/666,638

(22) Filed: Mar. 24, 2015

Related U.S. Application Data

(60) Provisional application No. 61/971,048, filed on Mar. 27, 2014.

(51) Int. Cl.
  *G06F 17/30* (2006.01)
  *H04L 29/06* (2006.01)
  (Continued)

(52) U.S. Cl.
  CPC .......... *G06F 17/3089* (2013.01); *G06F 3/048* (2013.01); *G06N 5/02* (2013.01);
  (Continued)

(58) Field of Classification Search
  CPC ....... G06F 17/3089; G06F 3/048; G06N 5/02; G06Q 10/10; G06Q 50/01; H04L 29/06
  See application file for complete search history.

(56) References Cited

U.S. PATENT DOCUMENTS

2011/0282943 A1* 11/2011 Anderson .............. G06Q 10/06
  709/204
2012/0066196 A1* 3/2012 Dempski ........... G06F 17/30864
  707/706

(Continued)

OTHER PUBLICATIONS

Mike Allton, "How to Craft and Schedule Social Media Posts using HootSuite", The Social Media Hat website, Jul. 31, 2013. Accessed Apr. 23, 2015 at http://www.the socialmediahat.com/article/how-craft-and-schedule-social-media-posts-using-hootsuite.

(Continued)

*Primary Examiner* — Brian J Gillis
*Assistant Examiner* — Amy Ling
(74) *Attorney, Agent, or Firm* — Van Pelt, Yi & James LLP

(57) ABSTRACT

Automated publication recommendation includes: obtaining, from a social networking site, social networking activity information pertaining to a set of social networking activities performed by a plurality of contacts on the social networking site; determining, at the social media management platform, a recommended time for the user to publish content on the social networking site such that the content is viewable by the plurality of contacts associated with the user, the determination being based at least in part on the social networking activity information that is obtained, and the recommended time being a time during which the plurality of contacts are deemed to be active on the social networking site; presenting the recommended time to the user; receiving an indication from the user to publish the content at the recommended time; and sending the content to the social networking site to be published at the recommended time.

19 Claims, 9 Drawing Sheets

(51) Int. Cl.
*G06Q 50/00* (2012.01)
*G06N 5/02* (2006.01)
*G06F 3/048* (2013.01)
*G06Q 10/10* (2012.01)

(52) U.S. Cl.
CPC ............ *G06Q 10/10* (2013.01); *G06Q 50/01* (2013.01); *H04L 65/403* (2013.01)

(56) References Cited

U.S. PATENT DOCUMENTS

| | | | | |
|---|---|---|---|---|
| 2012/0323909 A1* | 12/2012 | Behforooz | .......... | G06F 17/3053 707/728 |
| 2013/0055128 A1* | 2/2013 | Muti | .............. | G06Q 50/01 715/769 |
| 2013/0275348 A1* | 10/2013 | Booth | .............. | G06N 5/02 706/12 |
| 2014/0244759 A1* | 8/2014 | Smith | .............. | H04L 67/22 709/204 |
| 2015/0112957 A1* | 4/2015 | Ahmed | ............. | G06F 17/30595 707/706 |

OTHER PUBLICATIONS

Jason Keath, "When Is the Best Time of the Day to Blog?" Social Fresh website, Jan. 18, 2012. Accessed Apr. 23, 2015 at http://www.socialfresh.com/best-time-of-day-to-blog/.

* cited by examiner

|  | Existing Score based on last week's data | Number of postings this week | Number of comments this week | New Score |
|---|---|---|---|---|
| ... | ... | ... | ... | ... |
| Tues. 8:00-8:59 | 5 | 3 | 3 | =5*.75+3+3 = 9.75 |
| Tues. 9:00-9:59 | 7 | 4 | 8 | =7*.75+4+8 = 17.25 |
| Tues. 10:00-10:59 | 6 | 3 | 2 | =6*.75+3+2 = 9.5 |
| ... | ... | ... | ... | ... |
| Fri. 3:00-3:59 PM | 12 | 6 | 10 | =12*.75+6+10 = 25 |
| Fri. 4:00-4:59 PM | 8 | 3 | 15 | =8*.75+3+15 = 24 |
| Fri. 5:00-5:59 PM | 15 | 7 | 9 | =15*.75+7+9 = 27.25 |
| ... | ... | ... | ... | ... |

AUTOMATED CONTENT PUBLICATION ON A SOCIAL MEDIA MANAGEMENT PLATFORM

CROSS REFERENCE TO OTHER APPLICATIONS

This application claims priority to U.S. Patent Application No. 61/971,048, entitled RECOMMENDING PUBLICATION TIME FOR SOCIAL NETWORKING CONTENT filed Mar. 27, 2014 which is incorporated herein by reference for all purposes.

BACKGROUND

Social media has become an important way for online users to connect with each other, create content, and exchange information. On a social networking site such as Facebook®, Twitter®, LinkedIn®, Google+®, etc., a user forms connections with other users on the site. A user may view or publish content on the social networking site. In the context of content viewing and publishing, the user who publishes the content is referred to as the publisher-user and the user who views the content is referred to as the viewer-user. The same user can be a publisher-user or a viewer-user depending on whether he is publishing content or viewing content. When a viewer-user accesses the social networking site, content published by his contacts (i.e., users connected to him on the site) is shown to the viewer-user. A piece of content typically occupies the top position on the viewer-user's data feed when it is first published. However, because the platform is constantly refreshing and picking up latest published data to display, the published content by the publisher-user may lose its top position and go unnoticed by the viewer-user.

BRIEF DESCRIPTION OF THE DRAWINGS

Various embodiments of the invention are disclosed in the following detailed description and the accompanying drawings.

DETAILED DESCRIPTION

Figure 1:
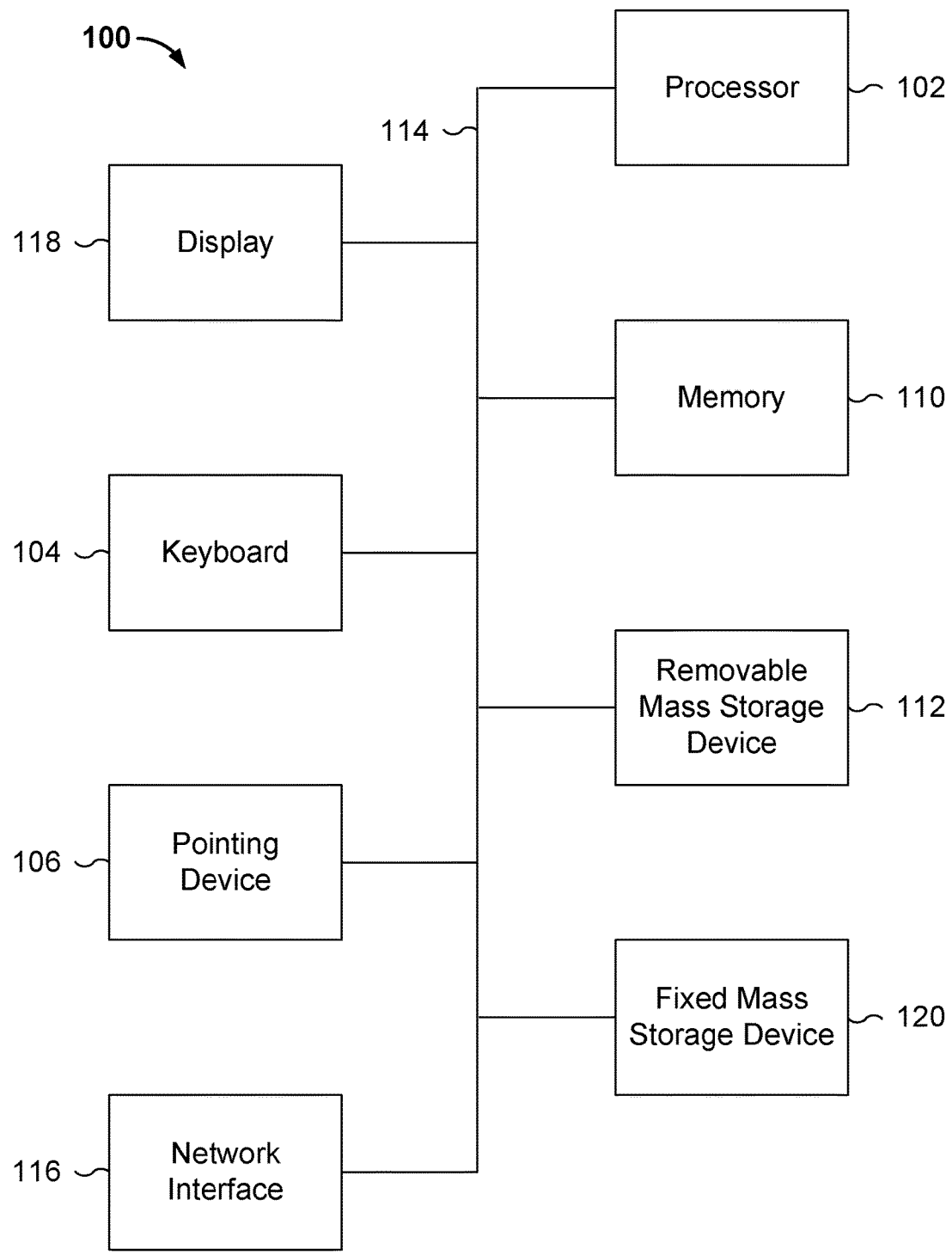
FIG. 1 is a functional diagram illustrating a programmed computer system for recommending content publication on one or more social networking sites in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Recommendation of content publication on one or more social networking sites is disclosed. As used herein, a publisher-user publishes content by using a social media management platform to upload the content to the one or more social networking sites. A viewer-user views content by logging on to the social networking site and receiving, at a client device, content published by other users of the social networking site. In some embodiments, social networking activity information pertaining to a set of social networking activities performed by a plurality of contacts associated with a user is obtained from the one or more social networking sites. The social networking activity information is analyzed to determine a recommended time during which the plurality of contacts is deemed to be active on the social networking site. In some embodiments, a recommended type of content is also determined. The recommendation is presented to the publisher-user. Upon receiving an indication from the publisher-user, the content is sent to the social networking site to be published at the recommended time.

FIG. 1 is a functional diagram illustrating a programmed computer system for recommending content publication on one or more social networking sites in accordance with some embodiments. As will be apparent, other computer system architectures and configurations can be used to perform the recommendation of publication time for content. Computer system 100, which includes various subsystems as described below, includes at least one microprocessor subsystem (also referred to as a processor or a central processing unit (CPU))

102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide elements 202-210 described below with respect to FIG. 2 and/or executes/performs the processes described below with respect to FIGS. 3-5.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or unidirectional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
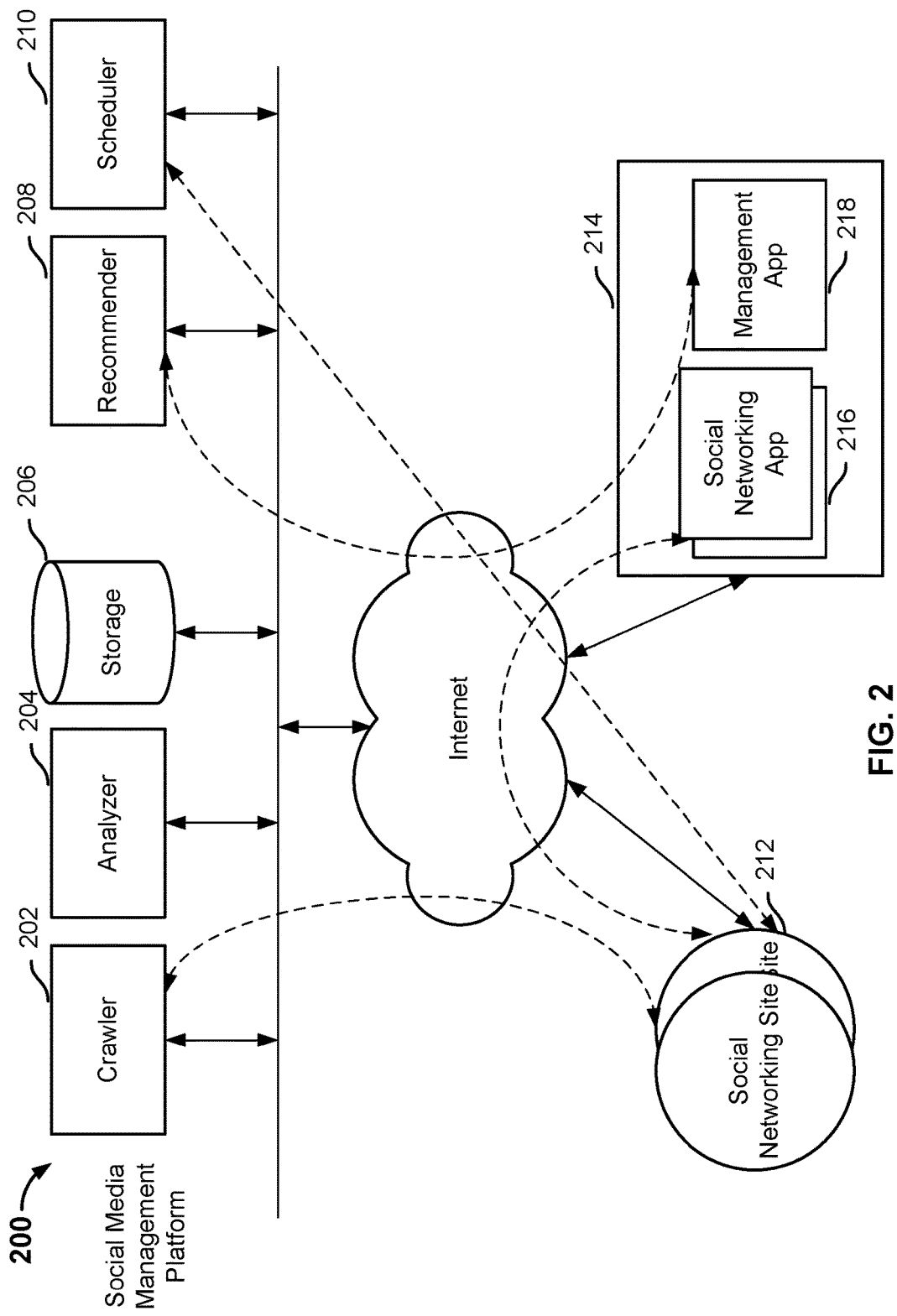
FIG. 2 is a block diagram illustrating an embodiment of a recommendation system for posting content on one or more social networking sites.

FIG. 2 is a block diagram illustrating an embodiment of a recommendation system for posting content on one or more social networking sites.

In the example shown, one or more client devices 214 are configured to communicate with one or more social networking sites 212 (e.g., Facebook®, Twitter®, LinkedIn®, Google+®, etc.) using social networking applications 216 which can be standalone applications or browser-based applications. The client device can be a laptop computer, a desktop computer, a tablet, a mobile device, a smart phone, a wearable networking device, or any other appropriate computing device. In some embodiments, a web browser or a standalone application is installed at the client device and enables a user of the client device to access the social networking site. For example, a user (who can be either a publisher or a viewer) with an account on a social networking site may access the site via a web browser or a standalone application, and perform actions supported by the social networking site such as posting content, viewing or commenting on content published by his contacts, making new contacts, etc. As used herein, a contact refers to someone who has an account on the social networking site and with whom the user has established a connection on the social networking site (in other words, on the social networking site, there is a connection formed between the account of the user and the account of the contact). For example, a contact may be a friend of the user on Facebook®, a follower of the user on Twitter®, and so on.

Client device 214 is further configured to communicate with social media management platform 200, which comprises one or more servers. A social media managed platform includes one or more servers configured to communicate with one or more social networking sites and perform certain functions on the social networking sites. In this case, social media management platform 200 gives a user (who has at least one account on the management platform and at least one account on the social networking site) the capabilities of managing activities on the social networking sites. An example of a social media management platform is the Hearsay Social Management Platform by Hearsay Social, Inc. For example, John Doe is a manager at an insurance company that subscribes to the Hearsay Social Management Platform. John has an account on the Hearsay Social Management Platform, through which he accesses a management application to manage activities on various social networking sites via his personal accounts (e.g., John Doe's accounts on Facebook®, Twitter®, LinkedIn®, and/or Google+®) and/or the company's account (e.g., the insurance company's account on the social media management platforms to which John Doe has access rights). In this context, John is a publisher-user on the social networking sites.

Examples of management capabilities include monitoring activities of the user's contacts on the social networking site, determining a recommended time for the user to publish content, determining a recommended type of content or a specific piece of content to publish, scheduling and uploading content to be published on the social networking site, etc. Using a management application 218 (which can be browser-based or standalone) executing on client device 214, a user such as John Doe who has an account on social media management platform 200 interacts with the platform, and performs social networking management related functions such as generating and selecting content to be published, and selecting a time to publish the content on social networking site(s) 212 via his account(s) on the social networking site(s). Through the use of application programming interfaces (APIs) published by the social networking site(s), the social media management platform interacts with the social networking site(s) to accomplish tasks such as obtaining social networking activity data, posting content, monitoring content, etc.

In this example, social media management platform 200 includes: a crawler 202 configured to gather social networking activity data of the user's contacts from one or more social networking sites 212; an analyzer 204 configured to analyze the data obtained by the crawler and determine the best time and type of content to post; a storage 206 configured to store the crawled data, analysis results, and/or content available for publication; a recommender 208 configured to, based on the analysis results, make a recommendation on the time to post, type of content to post, and/or specific content to post; and a scheduler 210 configured to publish the content at a recommended time to social networking site 212.

Crawler 202, analyzer 204, storage 206, recommender 208, and scheduler 210 can be implemented as software components executing on one or more general purpose processors, as hardware such as programmable logic devices and/or Application Specific Integrated Circuits designed to perform certain functions, or a combination thereof. In some embodiments, the components can be embodied as software products which can be stored in a nonvolatile storage medium (such as optical disk, flash storage device, mobile hard disk, etc.), including a number of instructions for making a computer device (such as personal computers, servers, network equipment, etc.) implement the methods described in embodiments of the present application. The components may be implemented on a single device or distributed across multiple devices. The functions of some components may be combined or further divided into multiple sub-components. One or more of components 202-210 can be implemented on a system such as 100. As shown, components 202-210 are connected to a network, a bus, or any other appropriate communications medium. The components are configured to communicate and interact using one or more appropriate protocols.

Figure 3:
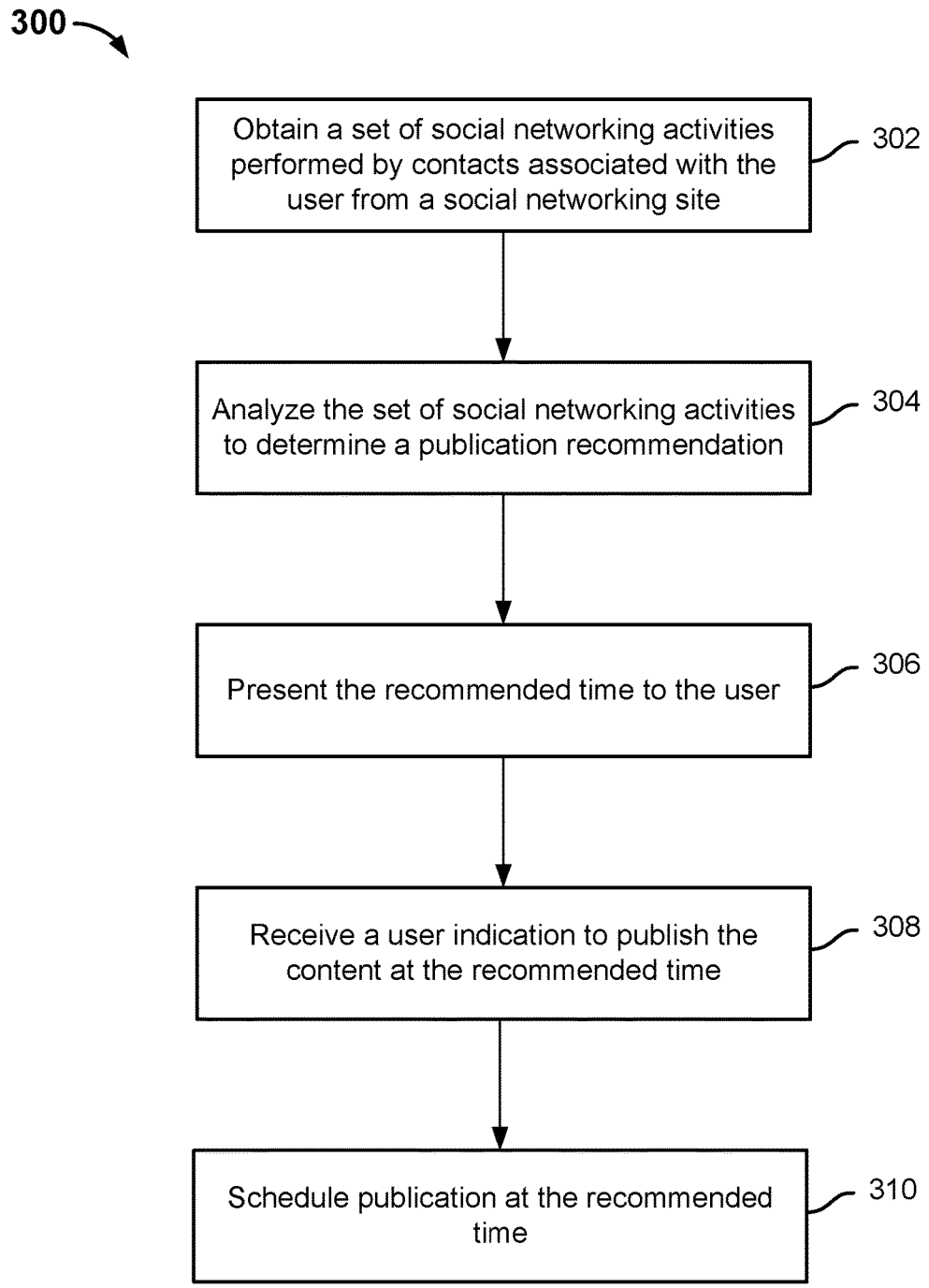
FIG. 3 is a flowchart illustrating an embodiment of a process for recommending a time and/or type of content to publish on a social networking site.

FIG. 3 is a flowchart illustrating an embodiment of a process for recommending a time and/or type of content to publish on a social networking site. Process 300 may be implemented on a social media management platform, using one or more devices such as 100.

At 302, data pertaining to a set of social networking activities performed by contacts associated with a user is obtained from a social networking site.

In this example, the social networking site provides APIs for functions such as authentication, data access, etc. When a user initially establishes an account on the social media management platform, he may grant permission by supplying authentication information associated with his account on the social networking site (e.g., account identifier/password combination). Once the user grants permission, the platform uses the authentication information to gain access to the user's account information on the social networking site (e.g., by invoking an authentication API provided by the social networking site). If the access is successful, in some embodiments, the social networking site returns a token indicating successful authentication. The authentication information and/or token information are stored for future use. Later, when the user logs onto his account on the social media management platform, the platform checks whether authentication information and/or token information for the user already exists. In some embodiments, it is determined whether the information can be found in a database on the platform. If there is existing authentication and/or token information, it indicates that the user has already given permission to access his account information on the social networking site. Otherwise, the platform requests permission from the user to access information pertaining to his account on the social networking site.

Once the management platform gains access to the user's information on the social networking site, the platform gathers data pertaining to social networking activities performed by the user's contacts by invoking one or more API calls specified by the social networking site. Examples of the social networking activities include publishing content (e.g., making a Facebook® post), providing feedback (e.g., commenting on or forwarding a Facebook® post), viewing published content, or other appropriate activities. For example, the "user/feed" function or the "user/links" function of the Facebook Graph API obtains feeds or comments from Facebook. In some embodiments, data returned by the social networking site in response to the API calls includes timestamp information and optionally metadata information, which is used to determine the recommended time for posting.

Gathering social networking activity data from the contacts of the user rather than a greater set of users reduces the amount of processing required for the recommendation analysis, and makes the recommendation more targeted. In some embodiments, to further reduce the processing required for the analysis, the social networking activity data that is gathered for analysis includes activities that require the person performing the activities to spend some effort or time. Thus, data about activities such as simply scrolling through/viewing others' postings is omitted but data about activities such as making a comment or a post is retained. Which activities are included in or excluded from the analysis depends on implementation. For example, information about the activity of indicating a "like" on Facebook® for a posting may be considered to be insufficient in terms of the performer's effort or time, and therefore is excluded in some implementations; in other implementations, the effort or time required for this activity may be considered sufficient, and therefore relevant information about the activity is included in the analysis. In some embodiments, a list of included activities is preconfigured and used by the crawler to determine the data that is to be gathered. In some embodiments, the user is given the option to configure which activities are included or excluded. The format of the data is typically specified by the social networking site and can vary from site to site.

At 304, the set of social networking activities is analyzed to determine a publication recommendation, including a recommended time to publish, a recommended type of content to publish, a specific recommended content to publish, or a combination thereof. Detailed example analysis processes are described in connection with FIGS. 5-7 below.

At 306, the publication recommendation is presented to the user, preferably via a user interface such as a display screen. If the user accepts the recommendation, a user indication to publish the content at the recommended time is received at 308. In some embodiments, a user indication of what content to publish is also received. If the user indicates a specific piece of content to be used, then the specific content is retrieved. If the user indicates a type of content to be used, a piece of content that matches the user indicated type is automatically retrieved.

At 310, the content is sent to the social networking site to be published at the recommended time. In some embodiments, the social media management platform and/or its underlying operating system provides a scheduling function. A task to upload the content to the social networking site is scheduled to execute at the social media management platform at the recommended time. When the recommended time is reached, a connection between the social media management platform and the social networking site is established, an API provided by the social networking site to publish the content is invoked by the scheduler, and the content is sent to the social networking site via the connection. If the content is successfully received by the social networking site, the content will become available and viewable by the user's contacts. For example, the content will be included in the contacts' newsfeeds and displayed to the contacts when they access the social networking site. In some embodiments, the social networking site provides an API that permits a piece of content to be published at a specified time. In such cases the scheduler can invoke the API sometime before the content is supposed to be published, and cause the content to be sent to the social networking site, which will schedule the content to be published at the recommended time.

In some embodiments, a user interface of the management application presents the recommended time and provides the user with the option to specify a time. Thus, the user may accept the recommendation or override the recommendation with a user-specified time, and a task to publish the content is scheduled at the designated time.

In some cases, the user has accounts on multiple social networking sites. In some embodiments, process 300 may be executed multiple times to gather data from each site, and come up with a recommended time for each site. In some embodiments, 302 is repeated to gather data from each site, and the data from multiple sites is collectively analyzed to determine a recommended time to publish content on all the sites.

In some embodiments, multiple recommendations are generated. Specifically, multiple recommended times are determined and content publications are scheduled automatically based on the recommendations. For example, if the user has selected N pieces of content to post, then N best time slots are selected, and each of the N pieces of content is automatically scheduled to be published at a corresponding time slot.

Figure 4:
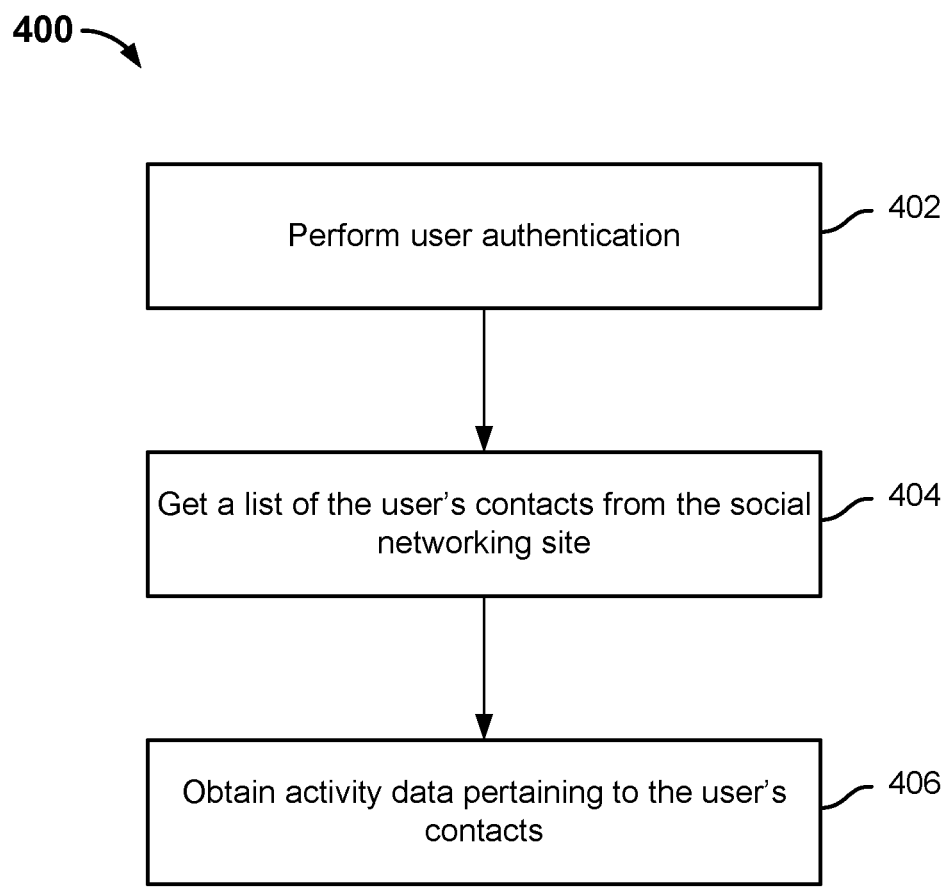
FIG. 4 is a flowchart illustrating an embodiment of a process for obtaining the social networking activities data.

FIG. 4 is a flowchart illustrating an embodiment of a process for obtaining the social networking activities data. Process 400 can be used to implement 302 of process 300.

In this example, the social networking site of interest is Facebook®. The process is similarly applicable to other social networking sites. At 402, user authentication is performed. As discussed above, the user authentication is performed by the social media management platform with respect to the user's account on the social networking site. In some embodiments, when the user obtains an account on the social network management platform, he is required to give permission to access his account on the social networking site before he is allowed to use the tools and features provided by the social media management platform. Subsequently, when the user logs onto the social media management platform, user authentication automatically takes place. In some embodiments, permission information such as username/password information (of the user's account on Facebook®) is sent from the social media management platform to Facebook® according to the Facebook® authentication API. In some embodiments, if the user was previously authenticated, token information associated with the user's Facebook® account is obtained from a database on the social network management platform, and sent to Facebook® according to the authentication API.

If authentication is successful, at 404, a list of the user's contacts is obtained from one or more social networking sites. For example, the Facebook Graph API's "get friend list" function is invoked to obtain the user's list of Facebook friends (also referred to as contacts).

At 406, activity data pertaining to the user's contacts is obtained from the social networking site. In some embodiments, an API call (e.g., a "get feed" function) is invoked for each contact to obtain postings that are made by the contact on the social networking site during a specified time frame; and another API call (e.g., a "get comments" function) is invoked for each posting to obtain the comments made in response to the user's posting during the specified time frame. In some embodiments, only comments made by the user's contacts are kept for later analysis, and other comments are filtered out. The activity data can be alphanumerical strings, log data, compressed data, or in any other appropriate format.

In some embodiments, a time frame is specified such that only data pertaining to social networking activities that occurred during the time frame is obtained. For example, the network management platform may request the social networking site to return data for the contacts' activities that occurred since the last time the data was gathered, or if this is the first time data is gathered, for the contacts' activities that occurred during a length of time (e.g., the past week, the past 10 days, etc.). Other time frames may be used in other embodiments. In various embodiments, the specification of the time frame is made by the publisher-user, or by the network management platform as a default value.

The obtained data pertaining to the postings and comments includes timestamp information. In some embodiments, additional metadata associated with the postings and comments is obtained. For example, the metadata may include name, age, gender, geographical location, the type of posting, any tags pertaining to the content posted, as well as other appropriate attribute data that is available from the social networking site and useful for further classification. Data pertaining to the postings and comments may be stored in memory (e.g., RAM) and/or other data storage (e.g., disk).

Figure 5:
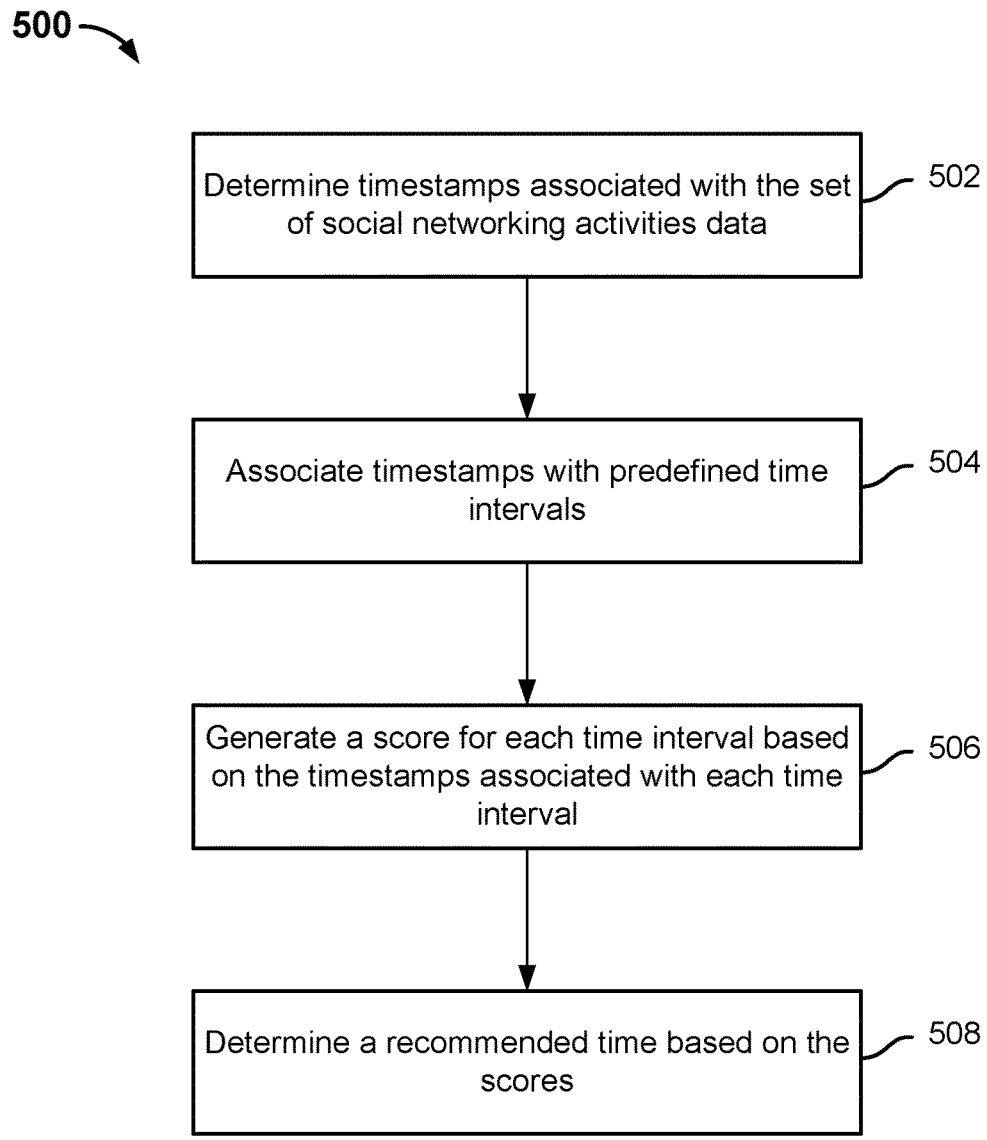
FIG. 5 is a flowchart illustrating an embodiment of a process for analyzing the social networking activities and determining recommendation information.

FIG. 5 is a flowchart illustrating an embodiment of a process for analyzing the social networking activities and determining recommendation information. Process 500 can be used to implement 304 of process 300 of FIG. 3. In some embodiments, process 500 is performed by an analyzer such as 204 of FIG. 2.

At 502, timestamps associated with the set of social networking activities data are determined. In some embodiments, the data pertaining to the set of social networking activities obtained from the social networking site is formatted to include timestamp information in coordinated universal time (UTC). The timestamp information is extracted from the obtained data.

At 504, associations are made between the timestamps and predefined time intervals. In some embodiments, the time frame for which activity data is gathered is divided into time intervals. For example, the time frame for gathering data is a week, and each hour of the week corresponds to a time interval. Each timestamp of an activity is associated with its corresponding time interval (e.g., a post activity that occurred at 11:28 AM on Tuesday is assigned to the time interval of 11:00-11:59 AM on Tuesday). Other time intervals can be used in other embodiments. For example, the time interval can be every 30 minutes of the week, every day during a month, etc.

At 506, a score is generated for one or more time intervals based on the timestamps associated with the one or more time intervals.

There are many ways to generate the score. In some embodiments, each time interval has a corresponding score, and the number of timestamps in each time interval is tallied to generate a score. For example, if 2 postings and 3 comments are made in the time interval of 9:00-9:59 AM on Monday, then the score corresponding to this time interval is 2+3=5. In some embodiments, different types of activities may be weighted differently, where an activity that requires more effort is given a higher weight. For example, a posting is weighted by a factor of 1.1 and a comment is weighted by a factor of 0.9, so that the score associated with this time period is computed as 2*1.1+3*0.9=4.9.

In some embodiments, the score accounts for both recent and past activities, and an old score is scaled down and added to the new tally. In other words, when data for the most recent time frame is obtained, the existing score based on old timestamps is multiplied by a scale factor (e.g., a value less than 1, such as 0.75) and added to the new tally, so that existing data is still accounted for but is weighted less than the new data. For example, if the old score for the time interval between 9:00-9:59 AM on Monday is 5, and the new tally for the time interval between 9:00-9:59 AM on Monday of this week is 7, then the current score for this time interval is 5*0.75+7=10.75.

In this example, the scores are generated based on the number of activities. In some embodiments, the content associated with the activities costs money to produce, and the cost information is a part of the activity's metadata. Accordingly, the score is generated to measure the amount of activities per unit of spending. In some embodiments, the scores are computed by dividing the number of activities by the amount of money spent to produce the content that led to the activities. In some embodiments, past scores are scaled and added to the current score as described above. Other ways of computing the score can be used in various embodiments.

At 508, a recommended time is determined based on the scores associated with the time intervals. The recommended time is preferably translated from UTC to the user's local time. In some embodiments, by default, the time interval with the highest score is chosen and presented to the user as the optimal time during the week to post content since that is the time frame when the user's contacts are found to be most active. In some embodiments, the user may wish to make multiple postings. Accordingly, multiple top-scoring time intervals are selected and presented to the user.

In some embodiments, the user specifies a time range, and the platform selects a time interval with the highest score in the specified time range. In some embodiments, the user is allowed to specify now or today as a special time range and the platform selects the time interval with the highest score in the time range between the current time and midnight. Preferably, the recommended time is converted from UTC time to the user's local time when it is displayed to the user.

As discussed above, in some embodiments the data includes metadata pertaining to the contacts. In some embodiments, the analysis process selects one or more subsets of data based on certain classification criteria to provide more pertinent recommendations. For example, the user may wish to target the content for his contacts located in California, and specifies this requirement through a user interface. Accordingly, a subset of data (e.g., postings and comments) by his contacts in California is selected based on metadata specification of the state associated with the activity and analyzed to determine the recommended time during which those California-based contacts are most active. Through the APIs exposed by the social networking site (e.g., Facebook's graph API), the social media management platform may allow the user to specify geographical region as the classification criteria, as well as many other classification criteria such as age, gender, etc. As another example, the user may target female contacts 65 years or older, and activity data by the user's contacts that meets this profile criteria is selected and analyzed to determine the recommended time during which these contacts are most active.

Figures 6A, 6B:
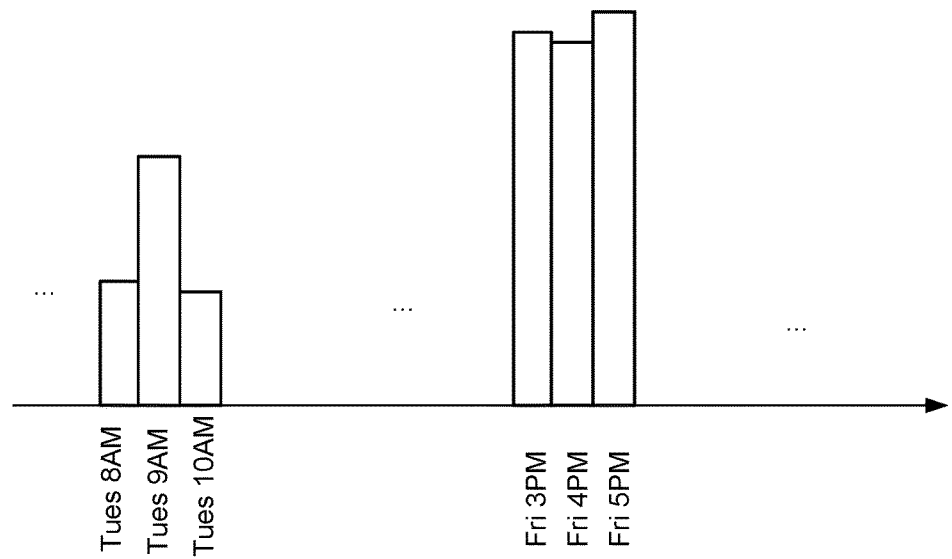
FIG. 6A is a diagram illustrating an example data set used for the analysis.
FIG. 6B is a histogram illustrating an example set of the scores.

FIG. 6A is a diagram illustrating an example data set used for the analysis. A table that includes the time intervals encompassing 24 hours, Sunday-Saturday is used. Data associated with a portion of the time intervals is displayed and the rest of the data is not shown. Each row in the table includes entries identifying the time interval, the existing score for the time interval, number of postings made by the user's contacts this week during the time interval, number of comments made by the user's contacts this week during the time interval, and a new score computed based on the old score and counts from this week. A ratio of 0.75 is used to scale the old score.

FIG. 6B is a histogram illustrating an example set of the scores. In this example, the X-axis corresponds to the time interval, and the Y-axis corresponds to the score. Data associated with the portions shown in FIG. 6A is displayed and the rest of the data is not shown. The histogram offers a visualization of the contacts' activities over time.

In the example of FIGS. 6A-6B, a single time interval is used to generate a score used to determine the optimal publication time. In some embodiments, multiple time intervals are used to generate a score. For example, the time interval for storing the gathered data is every 10 minutes, and the score to determine the recommended time is computed based on a one hour window starting at a fixed point during the hour (e.g., the beginning of the hour). Thus, the score is computed by aggregating the postings and comments made in 6 time intervals for each hour.

In some embodiments, rather than selecting a recommended time that starts at a fixed point during the hour, a sliding window is applied to the time intervals to compute an aggregated score. Additional scores are generated as the sliding window moves forward. A publication time associated with the window can be chosen to be a particular point within the window, such as the beginning, the midpoint, or the end of the time window. Based on the scores and the publication times, a recommended time is chosen. For example, suppose a set of data gathered in the time window of 8:00 AM to 8:00 PM is organized in 5-minute intervals. A sliding window spanning 12 time intervals is applied to data at time intervals 8:00 AM, 8:05 AM, 8:10 AM, . . . , and 8:55 AM to compute a first score that corresponds to a publication time of 8:30 AM, and then applied to data gathered at 8:05 AM, 8:10 AM, . . . , and 9:00 AM to compute a second score that corresponds to a publication time of 8:35 AM, and so on. The set of time intervals that yields the highest score is selected, and the publication time associated with the selected window (or equivalently, the set of time intervals with the highest score) is the recommended time.

In some embodiments, other applicable data to which the social media management platform has access to is analyzed. The applicable data can include activity data of more than the user's own contacts. For example, the data can further include activity data of all the users of the social media management platform and their contacts on the social networking site, a subset of users on the social networking site as provided by the social networking site's data collection API, etc. For example, in the case where the user is targeting contacts located in California, scores of activities during the same time frame for all contacts of all users of the social media platform located in California are obtained. These scores are optionally scaled and weighted, and added to the scores generated based on the user's own contacts (e.g., the scores shown in FIG. 6A or 6B) to give a modified result. The highest scoring time interval (or set of intervals) according to the modified result is selected as the recommended time.

In some embodiments, the scores are ranked, and the corresponding top ranking times are recommended to the user to post multiple pieces of content. If the user indicates that N (an integer) number of publications is desired, the scheduler will automatically schedule N pieces of content to be published at the selected times. The content can be automatically provided by a content generation application, manually selected by the user, or a combination.

Figure 8:
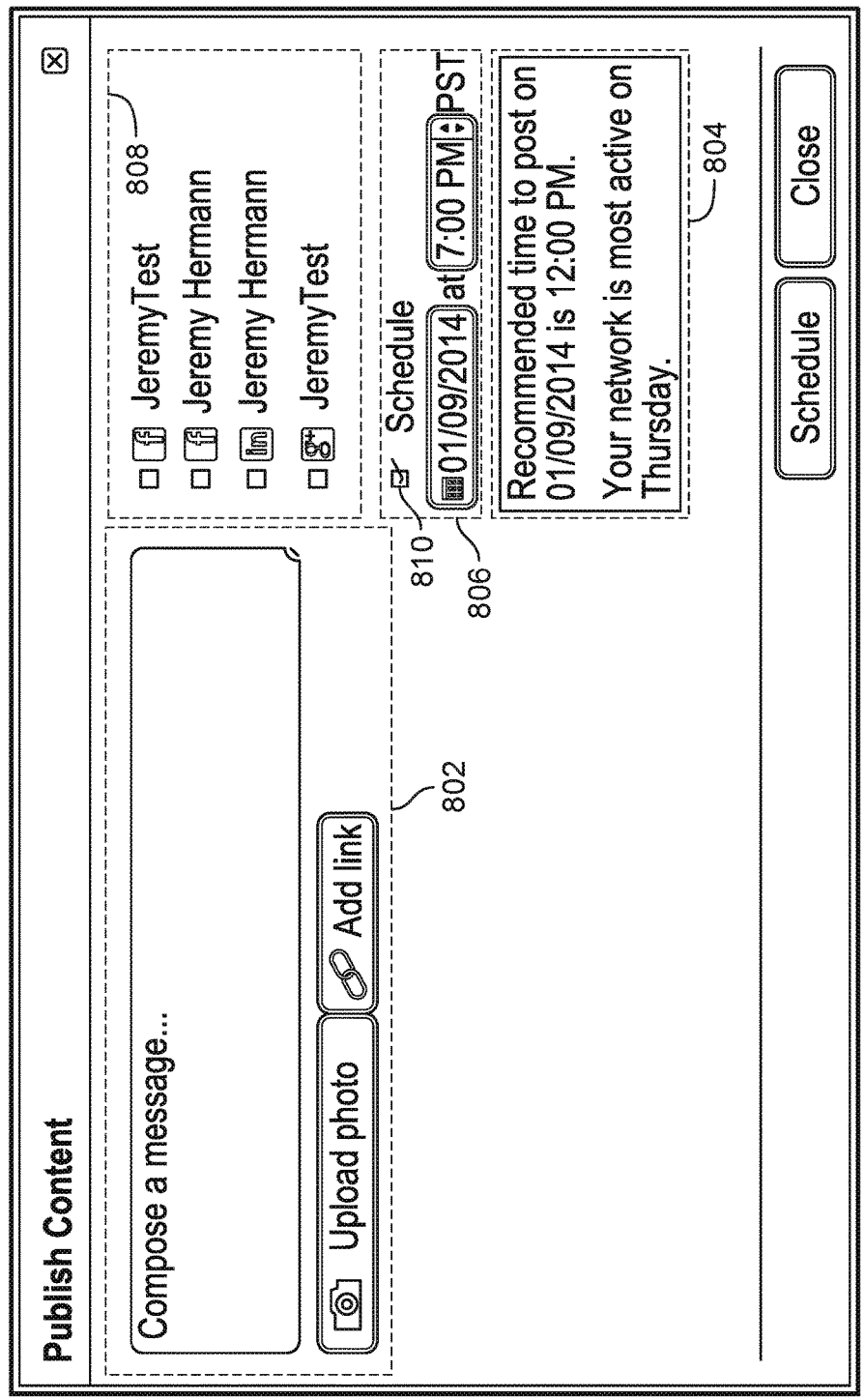
FIG. 8 is an embodiment of a user interface for content publication.

FIG. 8 is an embodiment of a user interface for content publication. In the example shown, a single time recommendation is made for multiple social networking sites. The user is given the option to configure the content to be published in area 802 on the screen. In some embodiments, the user is given the option to select preconfigured content from a content database (not shown). In area 808, the user's accounts on various social networking sites are listed, and the user is given the option to select one or more accounts on one or more social networking sites under which the content is to be published. The activity data associated with the selected accounts is obtained from the selected social networking sites and analyzed. By default, all accounts are selected.

In area 804, recommendations based on the analysis are presented to the user. Specifically, the user is informed that his network is most active at noon on Thursday and that the recommended time to post is at 12:00 PM on Thursday 01/09/2014. In area 806, a scheduling interface is presented to the user. In some embodiments, the recommended time is set by default in the scheduling interface, but the user has the option to adjust the date and time to schedule the content to be published. By clicking on "schedule" button 810, the user causes the scheduler to schedule the content for publication on the selected social networking site(s) under the selected account(s). For example, at the specified publication time, the social media management platform formats the content and invokes publish functions provided by the Facebook API, LinkedIn API, and Google+ API.

In some embodiments, the content available is classified according to one or more attributes, and the recommended time is selected based at least in part on one or more attributes of the content. In one example, the content attribute includes the type of story, which can be business-related or personal stories. Based on analysis of activity data, certain time intervals are deemed to have higher user activities. For example, for a typical week, viewers tend to have the highest activity score for business-related postings at 11:00 AM on Monday, and the highest activity score for personal stories at 9:00 PM on Thursday. Accordingly, if the content to be posted is classified as business-related, the recommender will select, based on the computed score, the most active time at 11:00 AM Monday as the recommended time; if the content to be posted is a personal story, the recommender will select the most active time at 9:00 PM Thursday as the recommended time.

Figure 7:
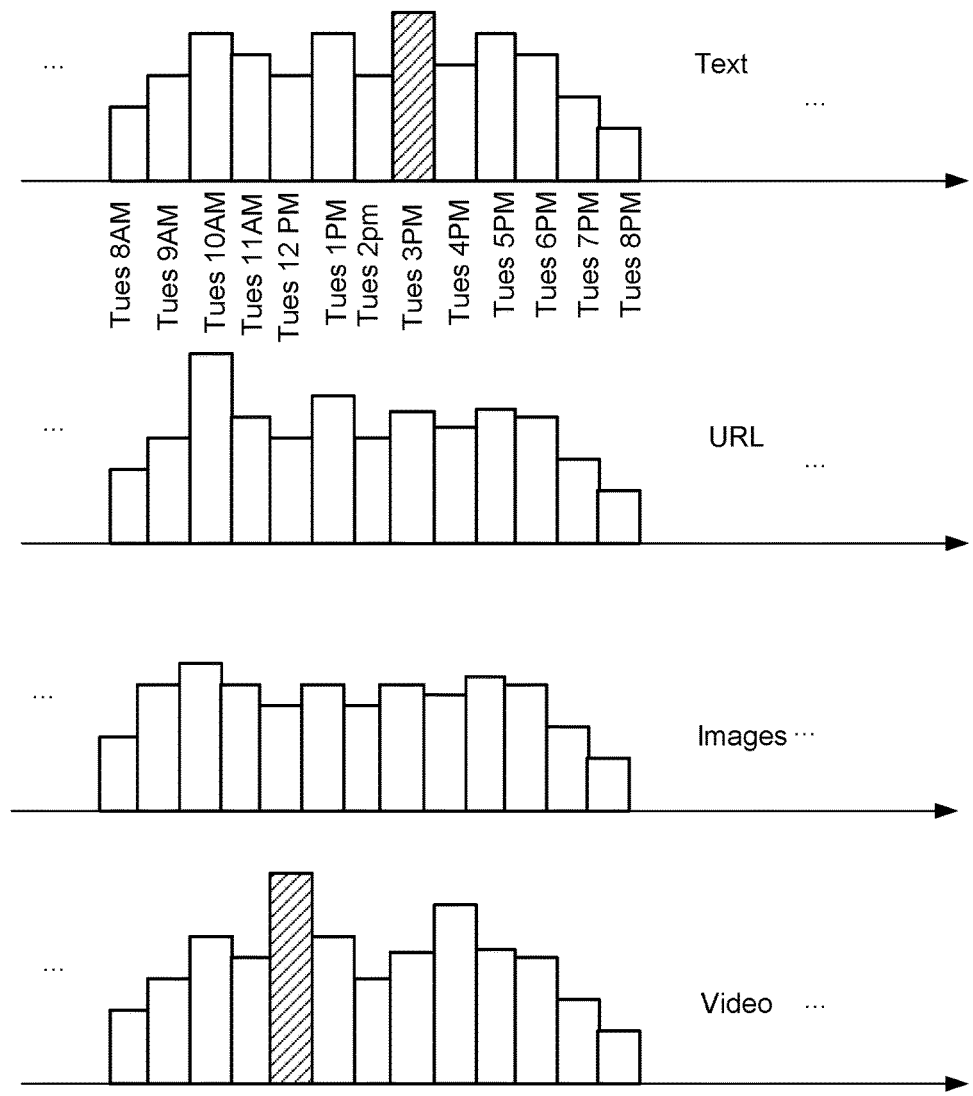
FIG. 7 illustrates four histograms of the four types of content for a period of time corresponding to the four different media types.

In another example, an attribute used to classify the content is the content's media type, which includes text, links (e.g., URLs), images, and videos. FIG. 7 illustrates four histograms of the four types of content for a period of time corresponding to the four different media types. To generate the histograms, the social networking activities are classified into four subsets, each subset corresponding to a respective media type; for each subset of social networking activities, timestamps of the subset of social networking activities are associated to their respective time intervals. A set of scores is computed based on the subset of social networking activities using techniques described above. Additional histograms for different combinations of media types (e.g., content that includes both text and links, that includes text and images, etc.) can also be generated in a similar manner. Other data representations such as tables can be used. In this example, if the user wishes to post any time during a time range, the four sets of scores of the four histograms are compared to determine the best media type (or combination of media types) and best time that corresponds to the highest score. For example, if the time range to post is between 8 AM-8 PM on Tuesday, the recommended media type and time to publish is video at 12 PM since the highest level of engagement as indicated by the score (or equivalently, the height of the histogram bin) corresponds to this type and time. On the other hand, if the user wishes to select the best type of content to post at a specific time, then the histogram bins corresponding to that time are compared to select the best media type to recommend. For example, to post at 3 pm, the highest level of engagement corresponds to text, which is recommended to the user for publishing at this time. In this example, the histograms are normalized to a scale of 0-1 for comparison purposes.

In some embodiments, content published on various social networking sites is tagged with other attribute information, such as the subject of the content (e.g., animals, children, flowers, etc.), the location of the content (e.g., continents, countries, states, cities, etc.), etc. Thus, the activity data associated with the content is also associated with the tagged attribute information. Many different types of content tags can be generated by the producers of the content and stored in pre-specified fields as strings or encoded identifiers. A publisher-user is given the option to select or specify one or more content tags, so that data analysis is performed for activity data corresponding to content with the same content tag(s) to generate scores. For example, if the user wishes to publish content whose subject pertains to children, then a score histogram of the user's contacts' activities pertaining to children (e.g., making postings that are classified as children-related, making comments in response to content that are classified as children-related, etc.) is generated. A recommended time is selected based on the generated scores.

In some embodiments, the recommender is further configured to identify a recommended type of content attribute as well as a recommended time to post such content. For example, if the user wishes to get a recommendation based on the subject of the content, then multiple histograms of engagement activities pertaining to content whose subjects are tagged as animals, children, or flowers are generated respectively. The scores are computed based on the histograms using the techniques described above. The subject with the highest score at a particular time (e.g., animals at 8 PM) is selected and recommended to the publisher-user.

In some embodiments, the analysis is performed individually for different social networking sites to generate distinct score sets for activities that took place separately on these networking sites. For example, for each media type shown in FIG. 7, separate score histograms are generated. For example, four score histograms are generated to represent text on Facebook, text on LinkedIn, text on Twitter, and text on Google+. These scores are analyzed to determine the best time to post text-based content on Facebook, LinkedIn, Twitter, and Google+, respectively.

Figure 9:
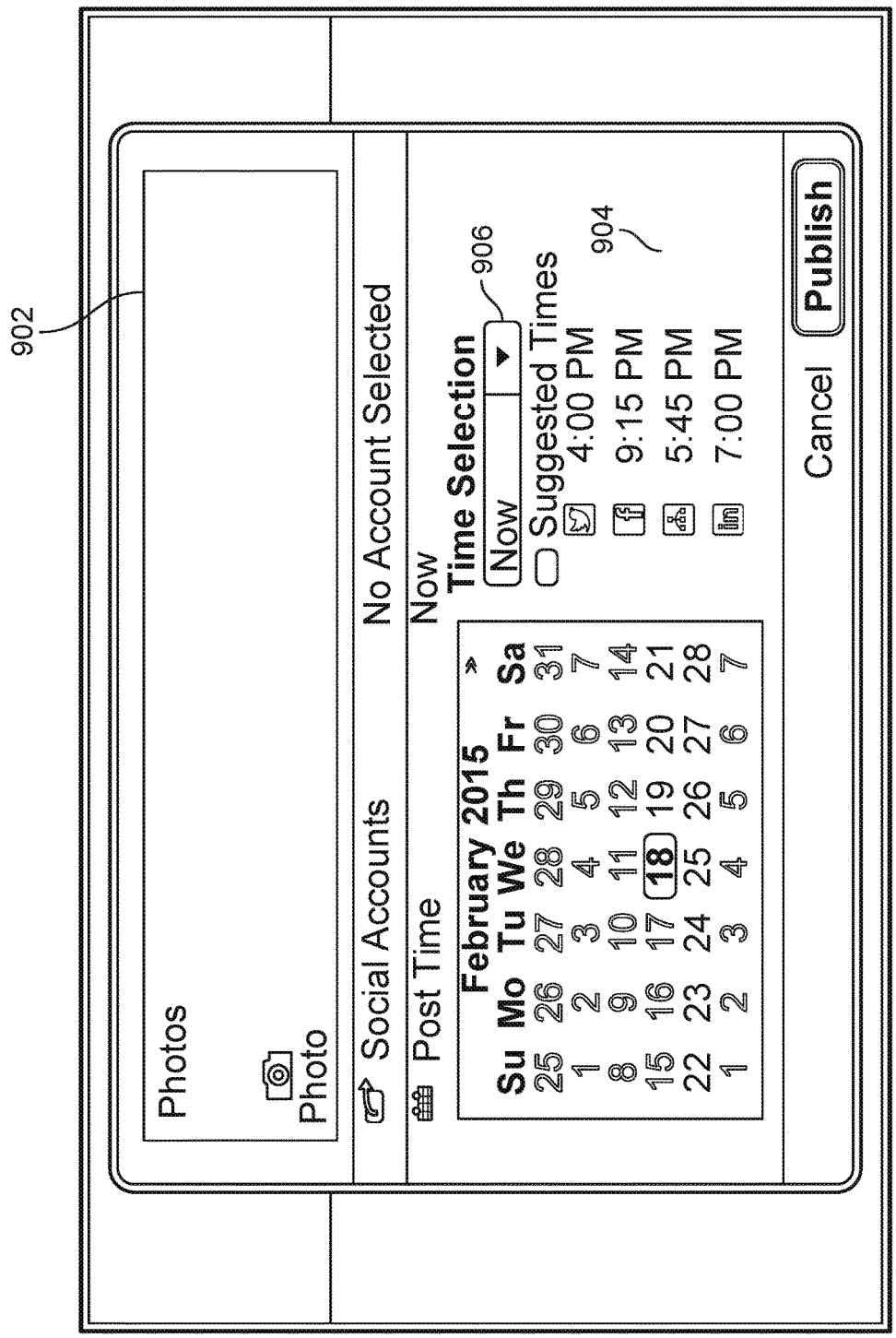
FIG. 9 is another embodiment of a user interface for content publication.

Based on the analysis results, separate posting recommendations are made for the respective social networking sites. FIG. 9 is another embodiment of a user interface for content publication. It is assumed that a piece of content to be published has been selected, either automatically by the platform's content selection application or manually by the user via a separate interface (not shown). In this example, the user specifies the attribute of the content in the publication interface. In the example shown, in area 902, the user specifies one or more attributes for the content to be published. In this case, the user specification is parsed and matched with a database of attribute keywords to determine the attribute being specified (in this case, media type=photos). In some embodiments, the selected content and/or its metadata is analyzed to automatically determine the attributes.

In time selection area 906, the user is given options that specify the time range for which the recommendation is to be made. In some embodiments, the options include "now" which specifies a time range from now until midnight today, "this week" which specifies a time range from now until Saturday 11:59 PM, and "this month" which specifies a time range from now until the end of this month. Other time range options can be provided. In this example, the time selection of "now" is selected and a time range from now until midnight is selected. Activities of the user's contacts on four different social networking sites for the last data gathering period and have the media type of photos are analyzed separately. The results indicate that the best times to post to Twitter, Facebook, a website operated by Hearsay, and LinkedIn are 4:00 PM, 9:15 PM, 5:45 PM, and 7:00 PM, respectively. These times are recommended to the user as the times to make the next post and are displayed in area 904. If the user clicks on the "publish" button, the user-selected content is scheduled to be published on these social networking sites at the corresponding best times.

Recommending content publication on one or more social networking sites is disclosed. The analysis of social networking activities on the social networking sites does not consume very much computation resources because the publisher-user's contacts are targeted, and a small data set is used. The resulting recommendation allows the publisher-user to publish information in an effective manner that will most likely elicit responses from these contacts. The architecture is flexible and allows the user to publish once on multiple social networking sites.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
obtaining, using a processor of a social media management platform, from a social networking site, social networking activity information pertaining to a set of social networking activities performed by a plurality of contacts on the social networking site, the plurality of contacts being contacts associated with a user of the social networking site who is also a user of a social media management platform, wherein the obtaining of the set of social networking activities performed by the plurality of contacts includes invoking an Application Programming Interface (API) provided by the social networking site to retrieve, for a contact of the plurality of contacts, information pertaining to social networking activities performed by said contact during a first time frame, wherein the processor of the social media management platform is configured to implement a crawler configured to gather the set of social networking activities;
determining, by the processor of the social media management platform, a recommended time for the user to publish content on the social networking site such that the content is viewable by the plurality of contacts associated with the user, and the recommended time being a time during which the plurality of contacts are deemed to be active on the social networking site, wherein determining the recommended time for the user to publish content on the social network site includes:
assigning a set of corresponding weights to the set of social networking activities, wherein a weight is based on a type of a corresponding social networking activity in the set of social networking activities;
dividing a second time frame into a plurality of time intervals;
associating each social networking activity of the set of social networking activities with a corresponding one of the plurality of time intervals;
computing, for each time interval of the plurality of time intervals, a score based at least in part on a number of social networking activities within the time interval and at least in part on the weight assigned to each of the social networking activities within the time interval; and
determining the recommended time based at least in part on the computed scores of the plurality of time intervals;
presenting the recommended time for a determined time interval of the plurality of time intervals to the user via a client device;
receiving from the client device via a network an indication from the user to publish the content at the recommended time; and
sending via the network the content to the social networking site to be published at the recommended time.

2. The method of claim 1, further comprising requesting the user to grant permission for the social media management platform to access an account of the user on the social networking site.

3. The method of claim 1, wherein the set of social networking activities performed by the plurality of contacts includes publishing content on the social networking site, providing feedback to published content, or both.

4. The method of claim 1, wherein determining the recommended time for the user to publish content on the social networking site includes:
determining a timestamp associated with each social networking activity of the set of social networking activities;
associating the timestamp associated with each social networking activity with one of the plurality of time intervals; and
identifying a time that corresponds to the time interval of the plurality of time intervals with a greatest number of timestamps as the recommended time.

5. The method of claim 1, wherein determining the recommended time for the user to publish content on the social networking site includes:
determining a timestamp associated with each social networking activity of the set of social networking activities;
associating the timestamp associated with each social networking activity with one of the plurality of time intervals;
computing a set of scores corresponding to the plurality of time intervals based on timestamps; and
identifying a time corresponding to the time interval of the plurality of time intervals that has a highest score as the recommended time.

6. The method of claim 5, wherein computing, for each time interval of the plurality of time intervals, a score includes scaling a set of old scores and adding the set of scaled old scores to a current set of scores computed based on the timestamps.

7. The method of claim 1, wherein
the set of social networking activities includes a plurality of types of social networking activities.

8. The method of claim 1, wherein determining the recommended time for the user to publish content on the social networking site includes:
classifying the set of social networking activities into a plurality of subsets of social networking activities, each subset corresponding to a respective content attribute type;
for each subset of the social networking activities:
associating timestamps of the subset of social networking activities to their respective time intervals among the plurality of time intervals; and
computing a set of scores based on the subset of social networking activities; and
comparing the sets of scores to determine the recommended time.

9. The method of claim 1, further comprising:
obtaining, from one or more additional social networking sites, additional social networking activity information pertaining to one or more sets of additional social networking activities performed by one or more additional plurality of contacts on the one or more additional social networking sites; and
determining the recommended time based at least in part on the additional social networking activity information.

10. A system, comprising:
one or more processors to:
obtain, from a social networking site, social networking activity information pertaining to a set of social networking activities performed by a plurality of contacts on the social networking site, the plurality of contacts being contacts associated with a user of the social networking site who is also a user of a social media management platform, wherein to obtain the set of social networking activities performed by the plurality of contacts includes to invoke an Application Programming Interface (API) provided by the social networking site to retrieve, for a contact of the plurality of contacts, information pertaining to social networking activities performed by said contact during a first time frame, wherein the social media management platform is configured to implement a crawler configured to gather the set of social networking activities;
determine, at the social media management platform, a recommended time for the user to publish content on the social networking site such that the content is viewable by the plurality of contacts associated with the user, and the recommended time being a time during which the plurality of contacts are deemed to be active on the social networking site, wherein to determine the recommended time for the user to publish content on the social network site, the one or more processors are further configured to:
assign a set of corresponding weights to the set of social networking activities, wherein a weight is based on a type of a corresponding social networking activity in the set of social networking activities;
divide a second time frame into a plurality of time intervals;

associate each social networking activity of the set of social networking activities with a corresponding one of the plurality of time intervals;

compute, for each time interval of the plurality of time intervals, a score based at least in part on a number of social networking activities within the time interval and at least in part on the weight assigned to each of the social networking activities within the time interval; and determine the recommended time based at least in part on the computed scores of the plurality of time intervals;

present the recommended time for a determined time interval of the plurality of time intervals to the user via a client device;

receive from the client device via a network an indication from the user to publish the content at the recommended time; and send via the network the content to the social networking site to be published at the recommended time; and one or more memories coupled to the one or more processors, to provide the one or more processors with instructions.

11. The system of claim 10, wherein the one or more processors are further to request the user to grant permission for the social media management platform to access an account of the user on the social networking site.

12. The system of claim 10, wherein the set of social networking activities performed by the plurality of contacts includes publishing content on the social networking site, providing feedback to published content, or both.

13. The system of claim 10, wherein to determine the recommended time for the user to publish content on the social networking site includes to:

determine a timestamp associated with each social networking activity of the set of social networking activities;

associate the timestamp associated with each social networking activity with one of the plurality of time intervals; and identify a time that corresponds to the time interval of the plurality of time intervals with a greatest number of timestamps as the recommended time.

14. The system of claim 10, wherein to determine the recommended time for the user to publish content on the social networking site includes to:

determine a timestamp associated with each social networking activity of the set of social networking activities;

associate the timestamp associated with each social networking activity with one of the plurality of time intervals;

compute a set of scores corresponding to the plurality of time intervals based on timestamps; and identify a time corresponding to the time interval of the plurality of time intervals that has a highest score as the recommended time.

15. The system of claim 14, wherein to compute, for each time interval of the plurality of time intervals, a score includes to scale a set of old scores and to add the set of scaled old scores to a current set of scores computed based on the timestamps.

16. The system of claim 10, wherein
the set of social networking activities includes a plurality of types of social networking activities.

17. The system of claim 10, wherein to determine the recommended time for the user to publish content on the social networking site includes to:

classify the set of social networking activities into a plurality of subsets of social networking activities, each subset corresponding to a respective content attribute type;

for each subset of the social networking activities:
associate timestamps of the subset of social networking activities to their respective time intervals among the plurality of time intervals; and
compute a set of scores based on the subset of social networking activities; and compare the sets of scores to determine the recommended time.

18. The system of claim 10, the one or more processors are further to:

obtain, from one or more additional social networking sites, additional social networking activity information pertaining to one or more sets of additional social networking activities performed by one or more additional plurality of contacts on the one or more additional social networking sites; and determine the recommended time based at least in part on the additional social networking activity information.

19. A non-transitory computer readable storage medium and comprising computer instructions for:

obtaining, from a social networking site, social networking activity information pertaining to a set of social networking activities performed by a plurality of contacts on the social networking site, the plurality of contacts being contacts associated with a user of the social networking site who is also a user of a social media management platform, wherein the obtaining of the set of social networking activities performed by the plurality of contacts includes invoking an Application Programming Interface (API) provided by the social networking site to retrieve, for a contact of the plurality of contacts, information pertaining to social networking activities performed by said contact during a first time frame, wherein the social media management platform is configured to implement a crawler configured to gather the set of social networking activities;

determining, at the social media management platform, a recommended time for the user to publish content on the social networking site such that the content is viewable by the plurality of contacts associated with the user, and the recommended time being a time during which the plurality of contacts are deemed to be active on the social networking site, wherein determining the recommended time for the user to publish content on the social network site includes:

assigning a set of corresponding weights to the set of social networking activities, wherein a weight is based on a type of a corresponding social networking activity in the set of social networking activities;

dividing a second time frame into a plurality of time intervals;

associating each social networking activity of the set of social networking activities with a corresponding one of the plurality of time intervals;

computing, for each time interval of the plurality of intervals, a score based at least in part on a number of social networking activities within the time interval and at least in part on the weight assigned to each of the social networking activities within the time interval; and determine the recommended time based on the computed scores of the plurality of time intervals;
presenting the recommended time for a determined time interval of the plurality of time intervals to the user via a client device;
receiving from the client device via a network an indication from the user to publish the content at the recommended time; and
sending via the network the content to the social networking site to be published at the recommended time.

* * * * *